(12) United States Patent
Perrella et al.

(10) Patent No.: US 7,869,798 B2
(45) Date of Patent: Jan. 11, 2011

(54) METHODS, SYSTEMS, AND COMPUTER-READABLE MEDIA FOR REDIRECTING TELEPHONE CALLS FROM A WIRELESS DEVICE IN A TELECOMMUNICATIONS NETWORK

(75) Inventors: Ronald Perrella, Norcross, GA (US); John Slemmer, Norcross, GA (US); Barrett Kreiner, Norcross, GA (US)

(73) Assignee: AT&T Intellectual Property I, L.P., Reno, NV (US)

( * ) Notice: Subject to any disclaimer, the term of this patent is extended or adjusted under 35 U.S.C. 154(b) by 0 days.

(21) Appl. No.: 10/964,369

(22) Filed: Oct. 13, 2004

(65) Prior Publication Data

US 2006/0079215 A1 Apr. 13, 2006

(51) Int. Cl.
*H04M 3/42* (2006.01)
(52) U.S. Cl. .................... 455/417; 455/405; 455/406; 455/466; 455/414.1
(58) Field of Classification Search ............. 455/456.1, 455/404.2, 417, 425, 466, 405–409, 403, 455/422.1, 412.1–414.2; 704/274
See application file for complete search history.

(56) References Cited

U.S. PATENT DOCUMENTS

| | | | | |
|---|---|---|---|---|
| 5,765,108 A | * | 6/1998 | Martin et al. | 455/422.1 |
| 2004/0111269 A1 | * | 6/2004 | Koch | 704/275 |
| 2004/0229600 A1 | * | 11/2004 | Saez et al. | 455/417 |
| 2005/0003830 A1 | * | 1/2005 | Campbell | 455/456.1 |
| 2006/0019631 A1 | * | 1/2006 | Hutcheson et al. | 455/406 |
| 2008/0046554 A1 | * | 2/2008 | Datta et al. | 709/223 |

\* cited by examiner

*Primary Examiner*—Huy Phan
(74) *Attorney, Agent, or Firm*—Parks IP Law LLC; Mickki D. Murray, Esq.

(57) ABSTRACT

Methods, systems, and computer-readable media are provided for redirecting telephone calls from a wireless device in a telecommunications network. The existence of a predefined condition is determined after an incoming call is received in the wireless device. The predefined condition may be based on a number of criteria including the current time and date, the current quantity of minutes used in the wireless device, the current estimated bill for usage of the wireless device, a current quantity of received calls in the wireless device when the incoming call is received, and the telephone number associated with the incoming call when the incoming call is received. If the predefined conditions exists, call forwarding rules stored in the wireless device are retrieved and executed from the wireless device. The call forwarding rules include instructions, based on the predefined condition, for redirecting the incoming call.

10 Claims, 5 Drawing Sheets

64

*FORWARD TO 999 999 9999 ON MONDAY THROUGH FRIDAY FROM 9AM TO 5PM*
*FORWARD TO 999 999 9999 IF PHONE DOESN'T PICKUP*
*FORWARD TO 999 999 9999 WHEN ESTIMATED BILL EXCEEDS $99*
*FORWARD TO 999 999 9999 WHEN ESTIMATED MINUTES USED EXCEEDS 999*
*FORWARD TO 999 999 9999 AFTER 99 RECEIVED CALLS.*

FORWARD TO 999 999 9999 ON MONDAY THROUGH FRIDAY FROM 9AM TO 5PM
FORWARD TO 999 999 9999 IF PHONE DOESN'T PICKUP
FORWARD TO 999 999 9999 WHEN ESTIMATED BILL EXCEEDS $99
FORWARD TO 999 999 9999 WHEN ESTIMATED MINUTES USED EXCEEDS 999
FORWARD TO 999 999 9999 AFTER 99 RECEIVED CALLS.

FIG. 5

METHODS, SYSTEMS, AND COMPUTER-READABLE MEDIA FOR REDIRECTING TELEPHONE CALLS FROM A WIRELESS DEVICE IN A TELECOMMUNICATIONS NETWORK

TECHNICAL FIELD

The present invention is related to call forwarding in a telecommunications network. More particularly, the present invention is related to redirecting telephone calls made to a wireless device by utilizing the wireless device to execute call forwarding rules stored in the wireless device.

BACKGROUND OF THE INVENTION

Many wireline and wireless telecommunications service providers offer call forwarding as a feature for redirecting telephone calls to subscribers. Typically, these features require the subscriber to specify an alternate telephone number for forwarding all incoming calls or unanswered incoming calls and to communicate this information to the service provider. Once the call forwarding information is received, the service provider forwards incoming calls to the subscriber's alternate telephone number. When the call forwarding feature is no longer desired, the subscriber is typically required to communicate selection to the service provider which then stops the forwarding of telephone calls.

One of the drawbacks associated with current call forwarding services is that the subscriber is required to remember to contact the service provider to manually activate and deactivate call forwarding. Thus, a subscriber runs the risk of not receiving telephone calls to a primary number if he or she forgets to contact the service provider to deactivate call forwarding. In an effort to address this situation, some service providers offer a "cradle" device which automatically activates the forwarding telephone calls to a preselected wireline telephone number when a wireless phone is "plugged in" to the cradle and which automatically deactivates call forwarding when the phone is removed. This previous solution, however, requires the subscriber to purchase and use the aforementioned cradle device. Furthermore, the subscriber is still required to communicate the forwarding telephone numbers to the service provider in order to use the cradle call forwarding device.

SUMMARY OF THE INVENTION

In accordance with illustrative embodiments of the present invention, the above and other problems are addressed by methods, systems, and computer-readable media for redirecting telephone calls made to a wireless device, by utilizing the wireless device to execute call forwarding rules stored in the wireless device.

According to one embodiment of the invention, a method is provided for receiving an incoming call in a wireless device, determining the existence a predefined condition, and if the predefined condition exists, then retrieving call forwarding rules stored in the wireless device. Each call forwarding rule includes instructions for redirecting a telephone call based on the predefined condition and the call forwarding rule may be selected from a menu in the wireless device. The method further includes executing the instructions in the call forwarding rules to redirect the incoming call in the telecommunications network. The predefined condition may be based on a number of criteria including the current time and date when the incoming call is received, the current quantity of minutes used in the wireless device when the incoming call is received, the current estimated bill for usage of the wireless device when the incoming call is received, a current quantity of received calls in the wireless device when the incoming call is received, and the telephone number associated with the incoming call when the incoming call is received.

The call forwarding rules which are executed based on the predefined condition may include instructions for forwarding the incoming call to a preselected telephone number during a specific time and date period, forwarding the incoming call to a preselected telephone number when a current quantity of minutes used exceeds a predetermined quantity of minutes, forwarding the incoming call to a preselected telephone number when a current estimated bill exceeds a predetermined amount, forwarding the incoming call to a preselected telephone number when a current quantity of received telephone calls exceeds a predetermined number of telephone calls, and forwarding the incoming call to a preselected telephone number when a telephone number associated with the incoming call is equivalent to a predetermined telephone number.

The method may also include updating the rules in the wireless device. The rules may be updated by uploading the rules from the wireless device to a web interface, updating the rules via the web interface, and downloading the updated rules into the wireless device. The rules may be communicated in short message service ("SMS") messages between the wireless device and the web interface.

Other aspects of the invention may be implemented as a computer process executed on a wireless device, a computing apparatus, or as an article of manufacture such as a computer program product or computer-readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

BRIEF DESCRIPTION OF THE DRAWINGS

FIG. 5 is a list showing illustrative call forwarding rules according to an illustrative embodiment of the invention.

DETAILED DESCRIPTION OF THE INVENTION

Figure 1:
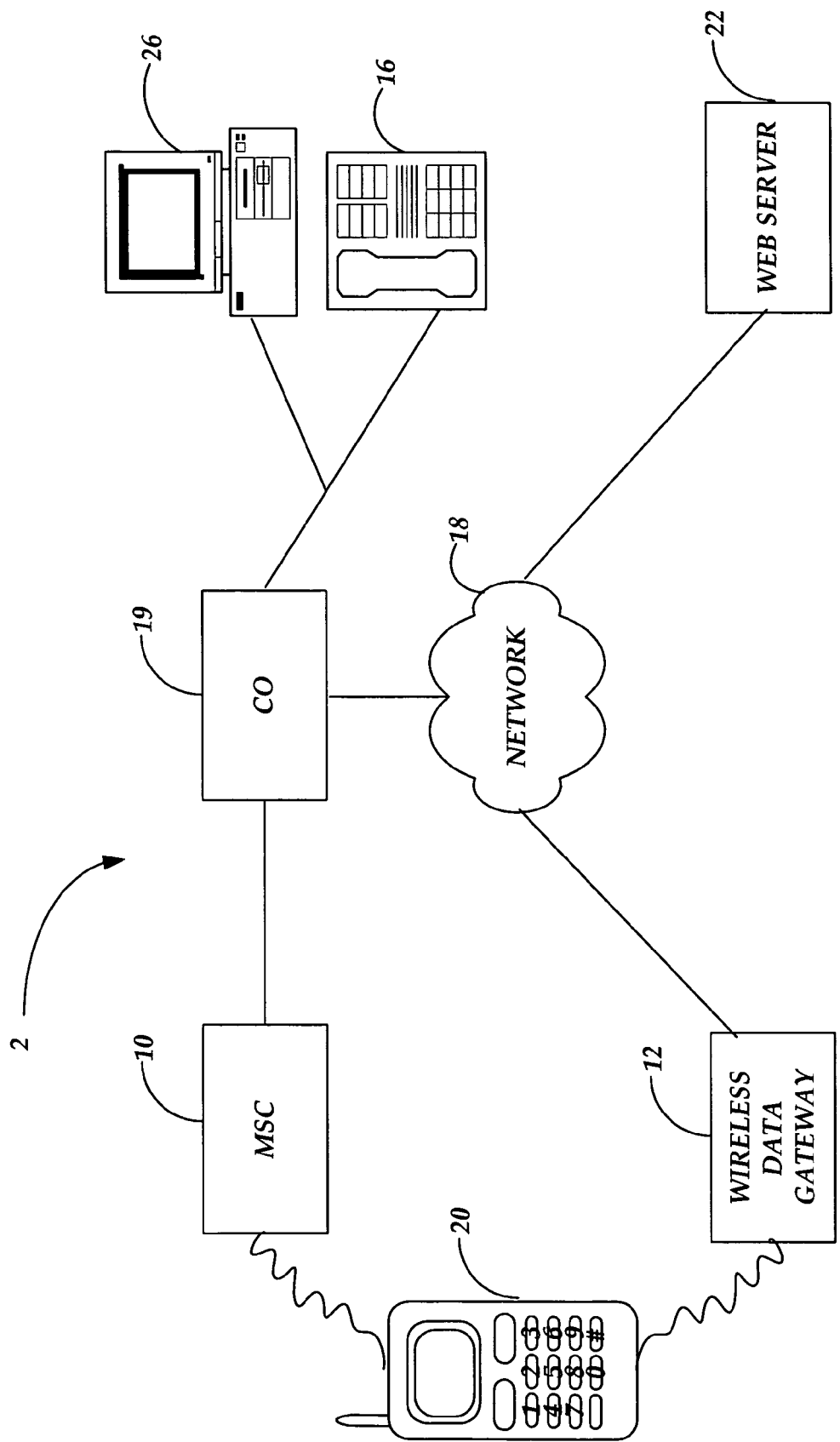
FIG. 1 is a network diagram illustrating aspects of a telecommunications network utilized in and provided by various illustrative embodiments of the invention.

Embodiments of the present invention provide methods, systems, and computer-readable media for redirecting telephone calls from a wireless device in a telecommunications network. In the following detailed description, references are made to the accompanying drawings that form a part hereof, and in which are shown by way of illustration specific embodiments or examples. Referring now to the drawings, in which like numerals represent like elements through the several figures, aspects of the present invention and the exemplary operating environment will be described.

FIG. 1 and the following discussion are intended to provide a brief, general description of a suitable network environment in which the invention may be implemented. Referring now to FIG. 1, an illustrative telecommunications network 2 for performing an illustrative embodiment of the invention will be described. As shown in FIG. 1, the telecommunications network 2 includes a wireless device, such as wireless telephone 20, utilized for voice and data communications. In an illustrative embodiment of the invention, the wireless telephone 20 may include "smart phone" functionality. As appreciated by those skilled in the art, smart phones combine the functions of a conventional mobile phone with functionality typically included in a personal or hand-held computer. This functionality includes the capability of saving data, executing software programs, sending and receiving e-mail and instant messages (including SMS messages), and accessing Web pages over the Internet. The components and functionality of the wireless telephone 20 will be discussed in greater detail below in the description of FIGS. 2-4.

In the telecommunications network 2, the wireless telephone 20 is in communication with a mobile switching center ("MSC") 10. The MSC 10 is utilized to communicate voice calls from the wireless telephone 20 to central office ("CO") 19 via a wireline connection. The CO 19 is connected to a standard or plain old telephone service ("POTS") telephone 16 and a computer 26 via standard wireline connections. Those skilled in the art will appreciate that the CO 19, the MSC 10 and the connections between them and the telephone 16 and the computer 26 may be components in a typical public switched telephone network ("PSTN"). According to illustrative embodiments of the invention, the CO 19 may comprise a standard central office circuit switch for routing telephone calls from the wireless telephone 20 in the PSTN.

In the telecommunications network 2, the wireless telephone 20 is also in communication with a wireless data gateway 12 for communicating data messages over network 18. It should be appreciated that the network 18 may be a wide area computer network, such as the Internet, a local area network. As is known to those skilled in the art, wireless data gateways enable wireless communication of data over a computer network. Those skilled in the art will further appreciate that the functions of the wireless data gateway 12 may be incorporated into the MSC 10. The telecommunications network 2 also includes a web server 22 for delivering web pages to connected devices over the network 18. It should be understood that the computer 26 may also be in communication with the network 18 via the CO 19 utilizing a variety of low speed and high speed connections, including, but not limited to, 56 Kbs modem connections as well as ISDN, DSL, and T1 lines. In alternative illustrative embodiments of the invention, the computer 26 may also communicate with the network 18 via wireless and wireline connections to a wireless network (such as a cellular network) or a cable services network via a cable modem. These and other connections for communicating with computer networks are well known to those skilled in the art.

Figure 2:
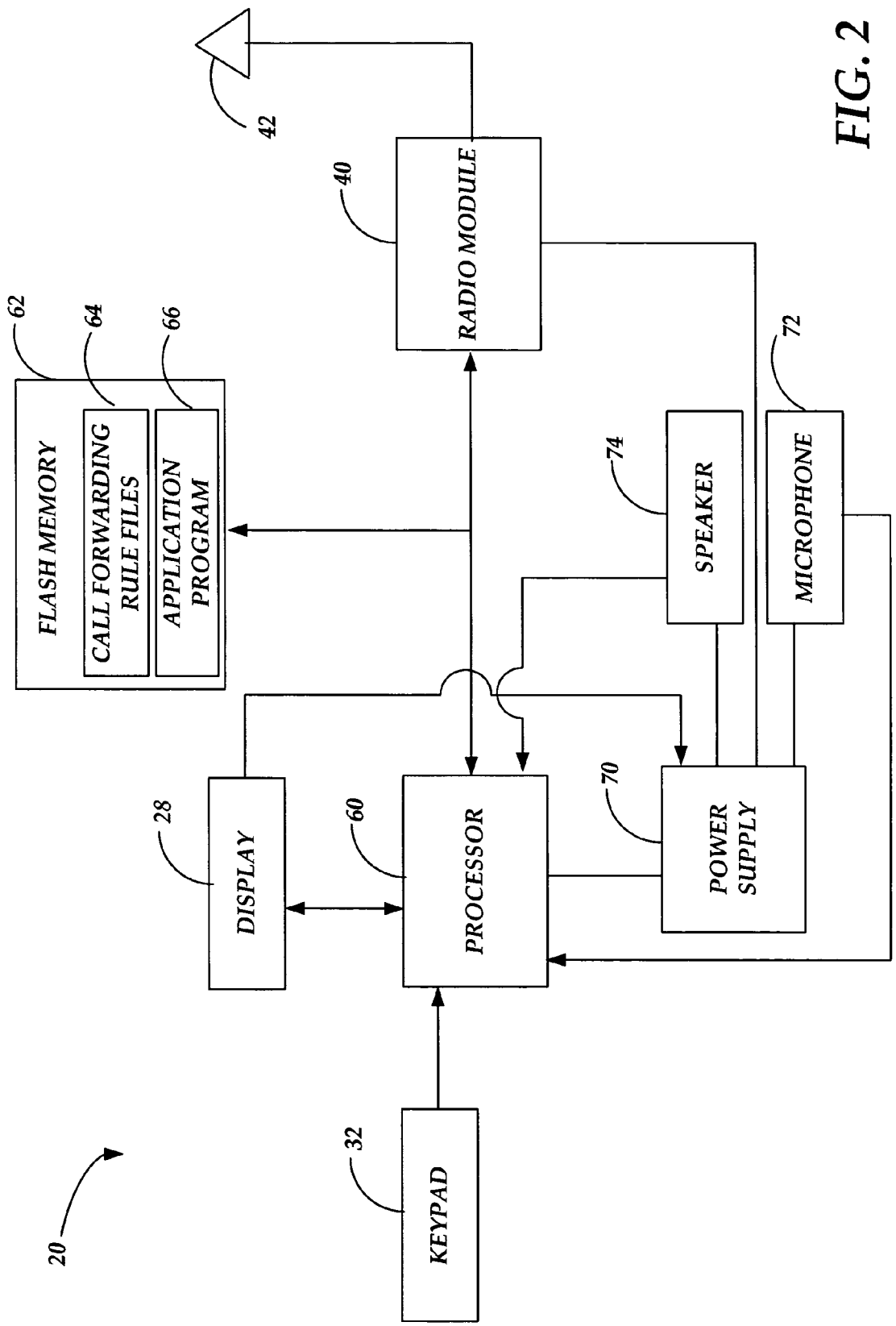
FIG. 2 is a block diagram of the wireless device illustrated in FIG. 1, according to an illustrative embodiment of the invention.

Referring now to FIG. 2, the wireless telephone 20 will now be described in greater detail. As shown in FIG. 2, the wireless phone 20 includes a processor 60 and a memory such as non-volatile memory such as "flash" memory 62. As is known to those skilled in the art, flash memory 62 is a type of reprogrammable memory enabling its contents to be easily updated. In the wireless telephone 20, the processor 60 is connected to a keypad 32, a display 28, a power supply 70, a radio module 40, a speaker 74, and a microphone 72. The radio module 40 sends and receives voice and data via connected antenna 42.

In the wireless telephone 20, the flash memory 62 stores call forwarding rule files 64 and an application program 66. The call forwarding rule files 64 store rules for forwarding telephone calls to the wireless device 20 based on predefined or call forwarding conditions detected by the application program 66 when a telephone call is received. Illustrative call forwarding rules are shown in FIG. 5. Once a call forwarding condition is detected, the application program 66 executes one or more of the rule files 64. In an illustrative embodiment of the invention, the application program 66 may be a Java applet which is capable of being interpreted by a web server. The application program 66 is also capable of generating a menu displaying the call forwarding rules on the display 28 for selection by a user via the keypad 32. The application program 66 is also capable of initiating communication with the web server 22 over the network 18 to update the call forwarding rule files 64. Logical operations illustrating the operation of the application program 66 in executing and updating the call forwarding rule files 64 will be described in greater detail below in the description of FIGS. 3-4.

Figure 3:
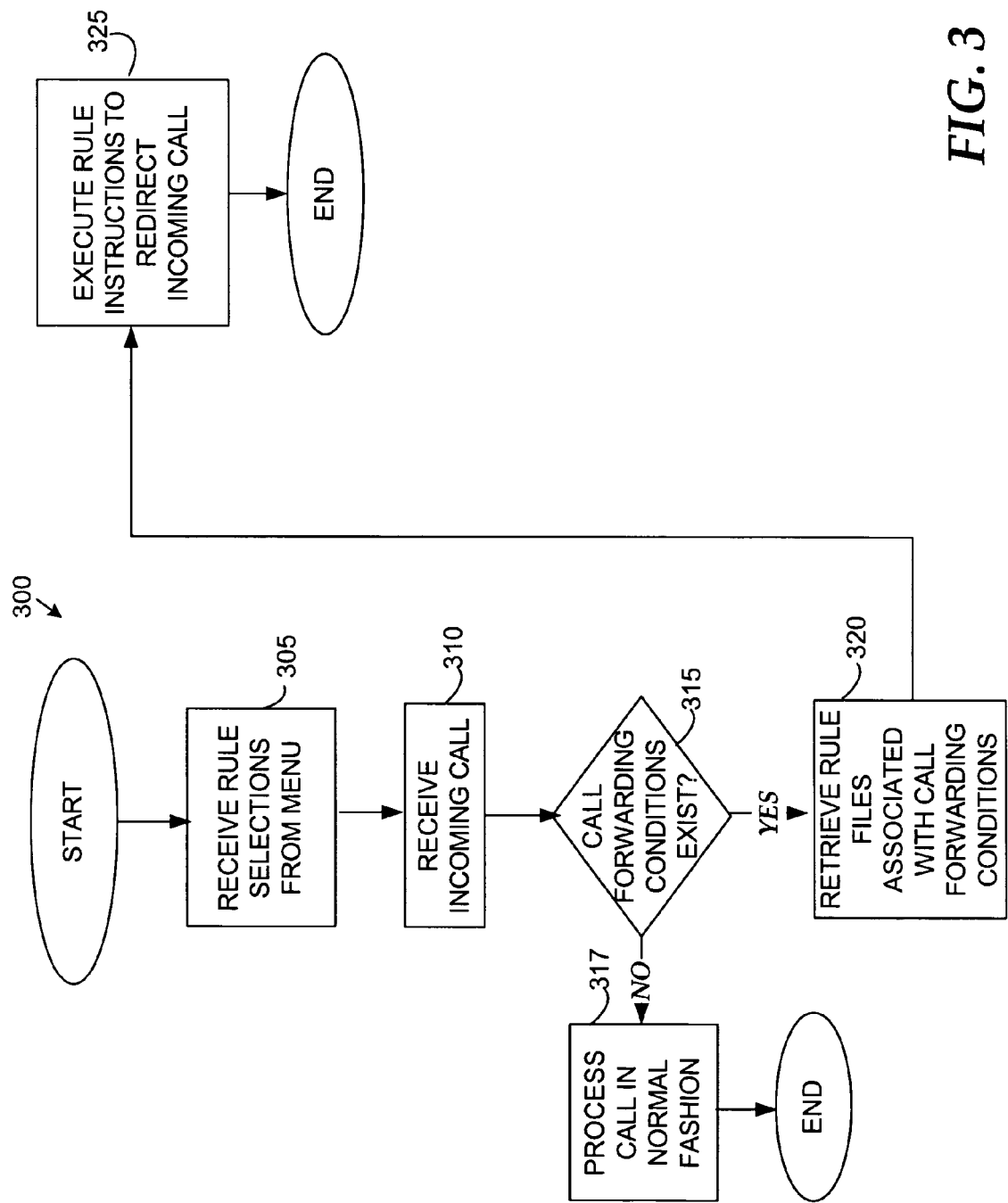
FIG. 3 is a flow diagram illustrating aspects of a process for executing call forwarding rules for redirecting telephone calls from a wireless device in the telecommunications network of FIG. 1, according to an illustrative embodiment of the invention.

Referring now to FIG. 3, an illustrative routine 300 will be described illustrating a process performed by the application program 66 redirecting telephone calls from the wireless telephone 20. The routine 300 begins at operation 305, wherein the application program 66 receives a user selection of one or more rules from the rule files 64. In particular, a user may invoke the application program 66 which generates a menu of rules such as the illustrative list shown in FIG. 5. The user may then select one or more of the rules to be executed when the condition associated with each rule is present when an incoming call is received in the wireless telephone 20. For instance, a user may select a rule forwarding all incoming calls received on weekdays between 9 A.M. and 5 P.M., to an alternate telephone number, such as a work telephone number.

From operation 305, the routine 300 continues to operation 310 where the application program 66 detects an incoming call received in the wireless telephone 20. The routine 300 then continues at operation 315 where the application program 66 determines if any call forwarding conditions associated with the selected call forwarding rules exist. For instance, when an incoming call is received, the application program 66 may determine that the rule for forwarding incoming calls when the estimated used exceeds 999 minutes has been selected. The application program 66 may be configured to determine the current number of minutes used by wireless telephone 20 by accessing a user menu built into the phone's software and compare this quantity to 999. If the current number of minutes is equal to or greater than 999, then the application program 66 determines that a call forwarding condition exists. If, at operation 315, the application program 66 determines that no call forwarding conditions exist, then the routine 300 continues to operation 317 where the incoming call is processed as a normal call by the wireless telephone 20. The logical operations 300 then end.

If, however, at operation 315 the application program 66 determines that one or more call forwarding conditions exist, then the routine 300 continues operation 320. At operation 320, the application program 66 retrieves the rule files 64 associated with the call forwarding conditions determined at operation 315 from the flash memory 62. Each rule file includes instructions for forwarding the incoming call to an alternate telephone number. The routine 300 then continues at operation 325 where the application program 66 executes the instructions in the retrieved rule files to redirect the incoming call to the wireless telephone 20 to one or more preselected telephone numbers. For instance, as shown in FIG. 5, the rule files 64 include instructions that all telephone calls meeting rule conditions be forwarded to telephone number 999 999 9999. After operation 325 the routine 300 then ends.

It will be appreciated that in one illustrative embodiment, the redirection of incoming calls may be accomplished by a wireless provider in communication with the wireless telephone 20. In particular, the wireless provider may periodically "poll" the wireless telephone 20 for redirect instructions whenever a connection is established between the wireless telephone 20 and a wireless network (e.g., between the wireless telephone 20 and the mobile switching center ("MSC") 10) or whenever the wireless telephone 20 syncs up with the wireless network. As is known to those skilled in the art, polling may be accomplished through the exchange of carrier signals between the wireless telephone and the wireless network. These carrier signals, as known to those skilled in the art, are operative to communicate a variety of data back and forth to the wireless network including network status information, whether the wireless phone is in use, etc. In the various illustrative embodiments of the invention, the wireless telephone 20 may be configured to communicate its current redirect status to the wireless network by communicating the currently selected rules from the rules file 64. The wireless network then redirects incoming telephone calls based on the communicated rules. It will be further appreciated that the It should be appreciated that in an illustrative embodiment of the invention, the rule files 64 may be executed in combination with multiple wireless telephones in a rotary fashion such that calls may be forwarded back to the original wireless telephone after all call forwarding options have been exhausted. For instance, a technical support organization may execute a rule for forwarding all incoming calls from outside of the organization to a primary technician during a certain date and time interval (e.g., Mondays through Fridays from 5 P.M until 11 P.M.). If forwarded calls to the primary technician are not answered, the primary technician's telephone may execute a rule forwarding all unanswered calls to a backup technician. If forwarded calls to the backup technician are not answered, then the backup technician's telephone may execute a rule forwarding all unanswered calls back to the main technical support number.

Figure 4:
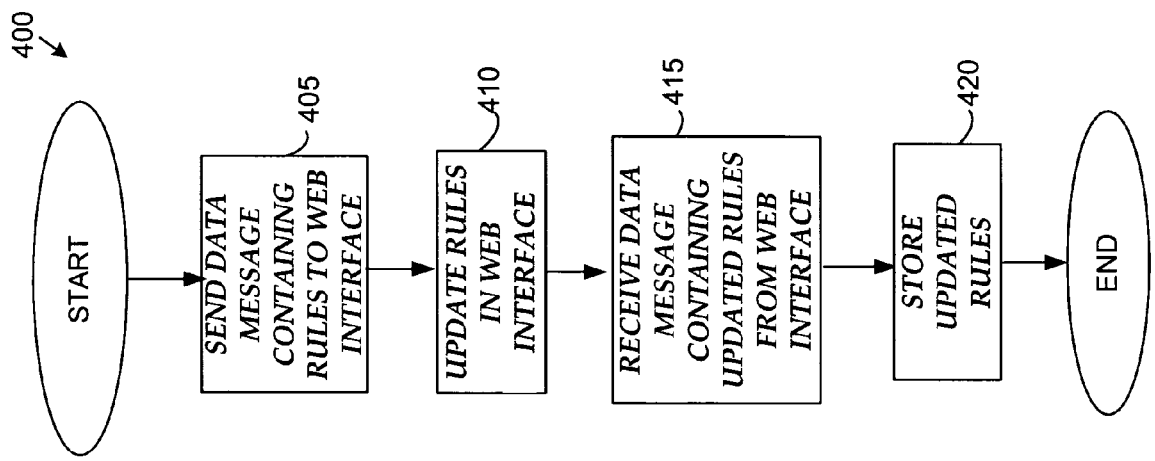
FIG. 4 is a flow diagram illustrating aspects of a process for updating call forwarding rules stored in a wireless device in the telecommunications network of FIG. 1, according to an illustrative embodiment of the invention.

Referring now to FIG. 4, a routine 400 for updating the rule files 64 in the wireless telephone 20 will now be described. The routine 400 begins at operation 405, where the application program 66 sends a data message containing a listing of the rules in the rule files 64 to a web interface, such as an Internet web page, hosted by the web server 22 (FIG. 1). The rules may be communicated in an SMS message to the web server 22. The web server 22 may be configured to list the rules on the Internet web page which may be accessible over the network 18 by a connected computing device such as the computer 26.

The routine 400 continues from operation 405 at operation 410 where the rules are updated in the web interface. In particular, a user of the computer 26 may access the web page hosted by the web server 22 to update the rules by modifying current rules or adding new rules. For instance, the call forwarding rule based on an estimated bill (FIG. 5) may be modified to change the bill amount from $99 to $50.

The routine 400 continues from operation 410 to operation 415 where the updated rules are received by the application program 66. In particular, the updated rules may be sent in an SMS message to the wireless telephone 20. The application program 66 may be configured to parse the message to retrieve the updated rules and store them in the flash memory 62 at operation 420. From operation 420, the routine 400 then ends.

While illustrative embodiments of the present invention have been shown and described, it will be apparent to those of ordinary skill in the art that a number of changes, modifications, or alterations to the invention as described may be made, none of which depart from the spirit of the present invention. For example, the wireless telephone 20 may be configured with a web browser for sending and receiving web pages enabling the rules to be updated from the wireless telephone itself. In one illustrative embodiment, an updated or initial rules file may be "downloaded" from the wireless network during an initial connection or periodic polling period between the wireless telephone and the wireless network. Furthermore, the rules files 64 may optionally be stored on a subscriber identify module ("SIM") card inside of the wireless telephone 20. As is known to those skilled in the art, SIM cards (also known as smart cards) may be utilized to store user data. A SIM can be moved from one phone to another and/or different SIMs can be inserted into any compatible phone. For instance, in the above-described illustrative embodiments of the invention, a SIM would provide additional storage for rule files as well as enable users to transfer rule files to multiple phones without programming or downloading them from a network. These and other such changes, modifications, and alterations should therefore be seen as within the scope of the present invention.

Based on the foregoing, it should be appreciated that the various illustrative embodiments of the invention include a method, system, and computer-readable medium for method for redirecting telephone calls from a wireless device in a telecommunications network. The above specification, examples and data provide a complete description of the manufacture and use of the composition of the invention. Since many embodiments of the invention can be made without departing from the spirit and scope of the invention, the invention resides in the claims hereinafter appended.

We claim:

1. A method for redirecting a call received at a wireless device operating on a telecommunications network, the method comprising:

receiving, at the wireless device, a short message service (SMS) message comprising data for updating a rule stored at the wireless device;

receiving the call at the wireless device;

recognizing, at the wireless device, the SMS message as a rule update message;

updating the rule stored at the wireless device;

analyzing, at the wireless device, the updated rule;

determining when a call forwarding condition associated with the updated rule exists, wherein determining that the call forwarding condition exists includes:

analyzing, at the wireless device, data relating to one of:

a quantity of minutes used by a user of the wireless device during a time period ending at a time at which the call is received; and a current estimated bill for usage of the wireless device, the current estimated bill for usage of the wireless device corresponding to the time period ending at the time at which the call is received; and determining, based upon one of the data relating to the quantity of minutes used and or the data relating to the estimated bill, that the forwarding condition is satisfied; and when the call forwarding condition is determined to exist, then redirecting the call.

2. The method of claim 1, wherein updating the rule in the wireless device comprises:

sending the rule in a data message to an external interface to update the rule at the external interface;

receiving, at the wireless device, an updated version of the rule from the external interface; and storing the updated version of the rule in the wireless device.

3. The method of claim 2, wherein the data message is a SMS message.

4. The method of claim 2, wherein the external interface is a web interface.

5. A system for redirecting a call received at a wireless device operating on a telecommunications network, the system comprising:

a memory for storing a plurality of rules comprising instructions for redirecting the call and executable program code for executing the plurality of rules based on the existence of a call forwarding condition; and a processor, in communication with the memory, the processor being responsive to computer-executable instructions contained in the program code and operative to:

update at least one of the plurality of rules by:
  receiving a short message service (SMS) message including an update for the at least one of the plurality of rules associated with the call forwarding condition;
  recognizing the SMS message received at the wireless device as a rule update message;
  determining the at least one of the plurality of rules to be updated by the update; and
  updating the at least one of the plurality of rules;

receiving the call;

determine when the call forwarding condition associated with the updated rule is satisfied, wherein determining that the call forwarding condition is satisfied includes analyzing data relating to at least one of:
  a quantity of minutes used during a time period ending at a time at which the call is received at the wireless device; and
  a current estimated bill for usage of the wireless device, the current estimated bill for usage of the wireless device corresponding to the time period ending at the time at which the call is received at the wireless device; and when the call forwarding condition is determined to exist to redirect the call.

6. The system of claim 5, wherein the processor is further operative to:

direct the wireless device to analyze data relating to the quantity of minutes used when the call is received at the wireless device; and direct the wireless device to determine if the call forwarding condition is satisfied based upon the data relating to the quantity of minutes used.

7. The system of claim 5, wherein the processor is further operative to update the at least one of the plurality of rules in the wireless device by directing the wireless device to:

send the at least one of the plurality of rules in a data message to an external interface to update the at least one of the plurality of rules at the external interface; and store, at the wireless device, an updated version of the at least one of the plurality of rules, upon receiving the updated version of the at least one of the plurality of rules from the external interface.

8. The system of claim 7, wherein the external interface is a web interface.

9. A non-transitory computer-readable medium comprising computer-executable instructions that, when executed by a processor, perform a method for redirecting a call received at a wireless device operating on a telecommunications network, the method comprising:

receiving, at the wireless device, a short message service (SMS) message comprising data for updating a rule stored at the wireless device;

receiving the call at the wireless device;

recognizing, at the wireless device, the SMS message as a rule update message;

updating the rule stored at the wireless device;

determining when a call forwarding condition associated with the updated rule exists, wherein determining that the call forwarding condition exists includes:
  analyzing, at the wireless device, data relating to one of:
    a quantity of minutes used by a user of the wireless device during a time period ending at a time at which the call is received; and
    a current estimated bill for usage of the wireless device, the current estimated bill for usage of the wireless device corresponding to the time period ending at the time at which the call is received; and
  determining, based upon one of the data relating to the quantity of minutes used and the data relating to the estimated bill, that the forwarding condition is satisfied; and when the call forwarding condition is determined to exist, then redirecting the call.

10. The non-transitory computer-readable medium of claim 9, wherein the computer-executable instructions that cause the processor to update the rule stored at the wireless device, cause the processor to:

send the rule in a data message to an external interface to update the plurality of rules at the external interface;

receive an updated version of the rule from the external interface; and store the updated version of the rule.

* * * * *